United States Patent
Ferguson

[15] 3,673,773
[45] July 4, 1972

[54] CROSS-FLOW MOWING MACHINE

[72] Inventor: Hugo S. Ferguson, Averill Park, N.Y.

[73] Assignee: Reel Vortex, Inc., Paestenkill, N.Y.

[22] Filed: Dec. 12, 1968

[21] Appl. No.: 783,192

Related U.S. Application Data

[63] Continuation-in-part of Ser. No. 699,596, Jan. 22, 1968, abandoned.

[52] U.S. Cl. ............................................56/13.3, 56/294
[51] Int. Cl. ......................................................A01d 35/24
[58] Field of Search ............56/24, 26, 29, 294, 289, 13.3, 56/13.4

[56] References Cited

UNITED STATES PATENTS

| 962,780 | 6/1910 | Nelson | 56/24 |
| 1,669,471 | 5/1928 | Jones | 56/26 |
| 1,778,219 | 10/1930 | Kuhlman | 56/294 |
| 2,864,223 | 12/1958 | Lundell | 56/24 |
| 3,159,957 | 12/1964 | Mathews | 56/24 |
| 3,210,918 | 10/1965 | Van der Lely | 56/24 |
| 3,331,195 | 7/1967 | Heth et al. | 56/24 |
| 3,362,144 | 1/1968 | Bumgardner | 56/24 |

FOREIGN PATENTS OR APPLICATIONS

| 1,095,507 | 12/1967 | Great Britain | 56/24 |

*Primary Examiner*—Antonio F. Guida
*Attorney*—Pennie, Edmonds, Morton, Taylor & Adams

[57] ABSTRACT

A cylindrical reel having a plurality of spaced blades is horizontally mounted on a carriage. The reel is driven at high speed about its axis and the outer leading edges of the blades are sharp. A blower conduit cooperates with the reel. The reel, the speed of rotation and the blower conduit are designed to form a blower of the cross-flow type. Vortex action around the leading blades of the reel bend the grass toward the cutting edges of the blades to yield effective mowing, and the cut grass is discharged through the blower conduit. Reel, blade and housing features promoting satisfactory operation are described.

33 Claims, 26 Drawing Figures

PATENTED JUL 4 1972

INVENTOR.
Hugo S. Ferguson

BY
Pennie Edmonds Morton Taylor & Adams
ATTORNEYS

INVENTOR.
Hugo S. Ferguson
BY

ATTORNEYS

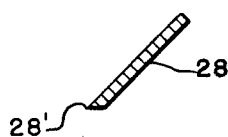
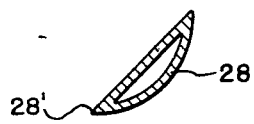
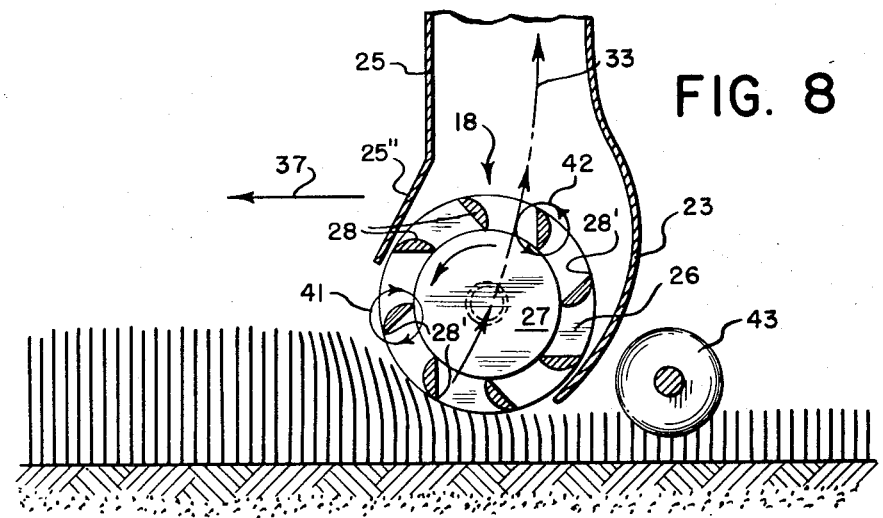
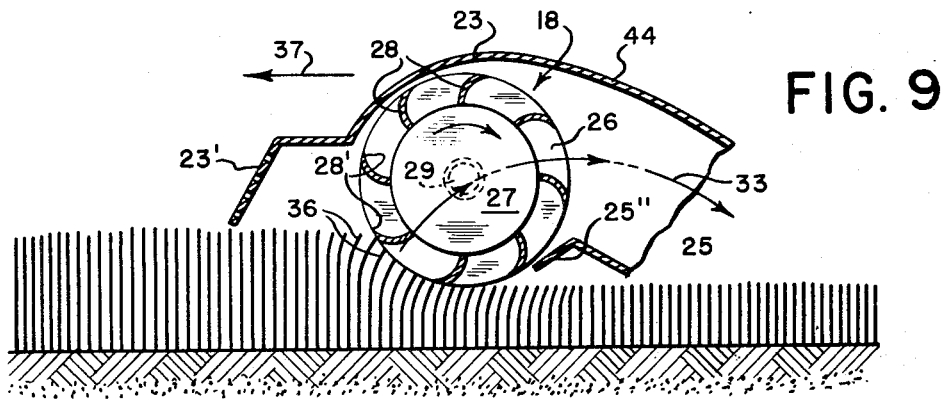

FIG. 14
FIG. 16
FIG. 17
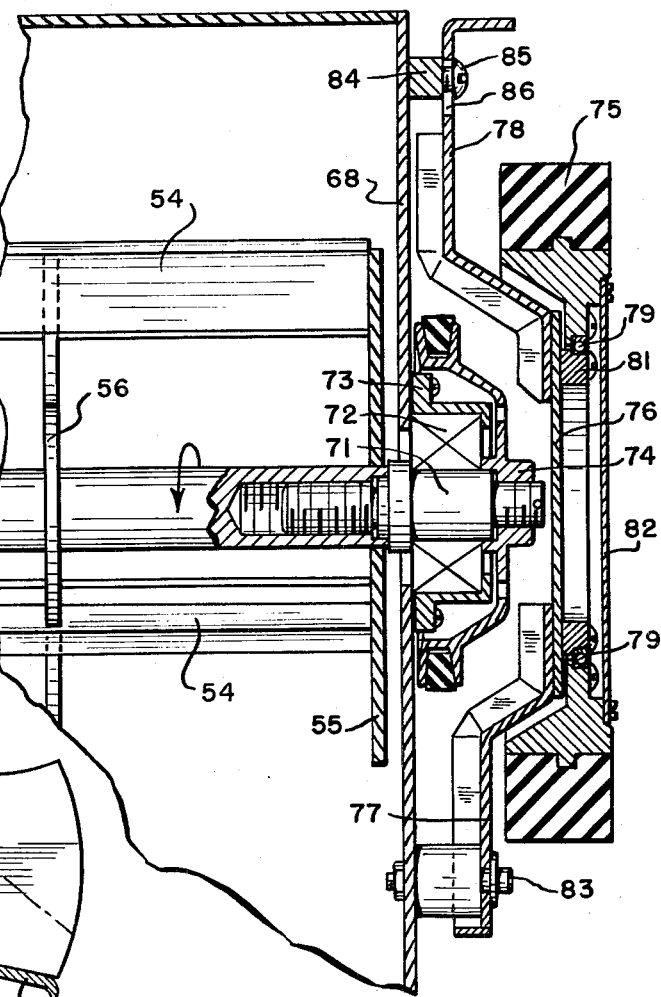
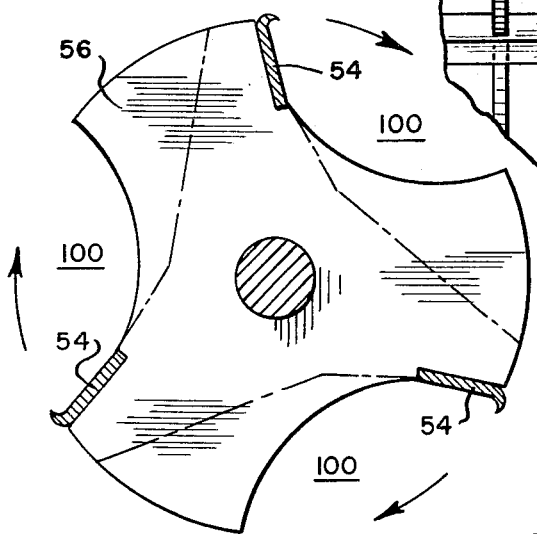
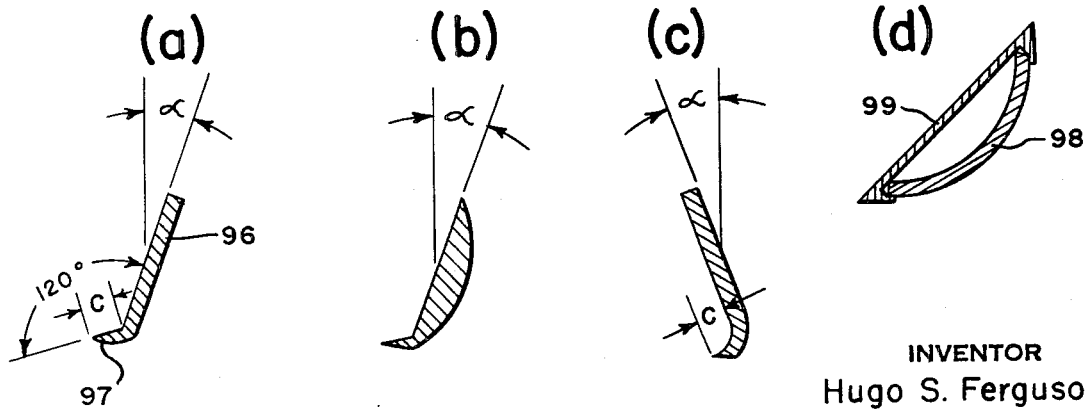
INVENTOR
Hugo S. Ferguson
BY
ATTORNEYS

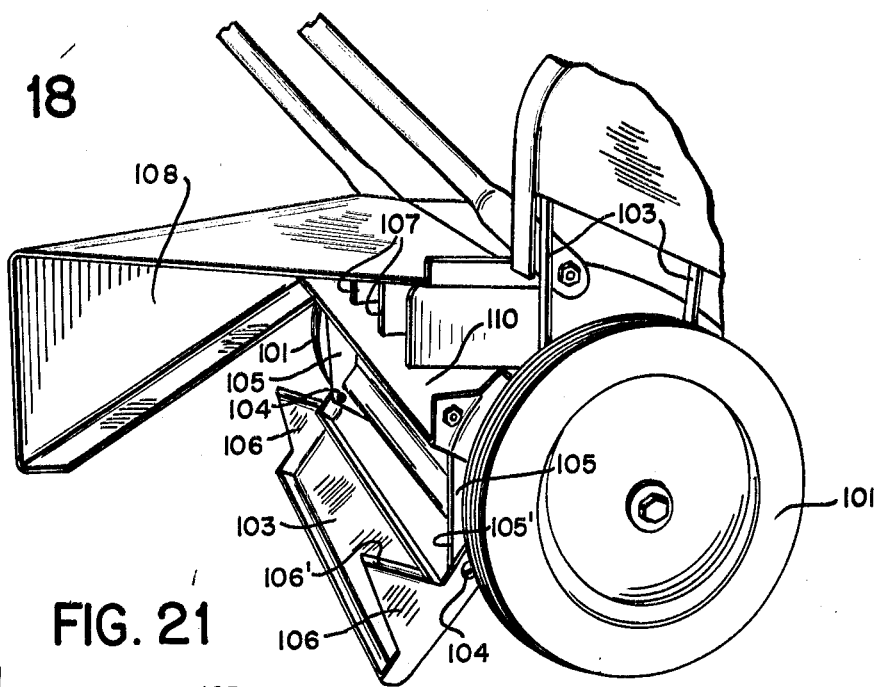
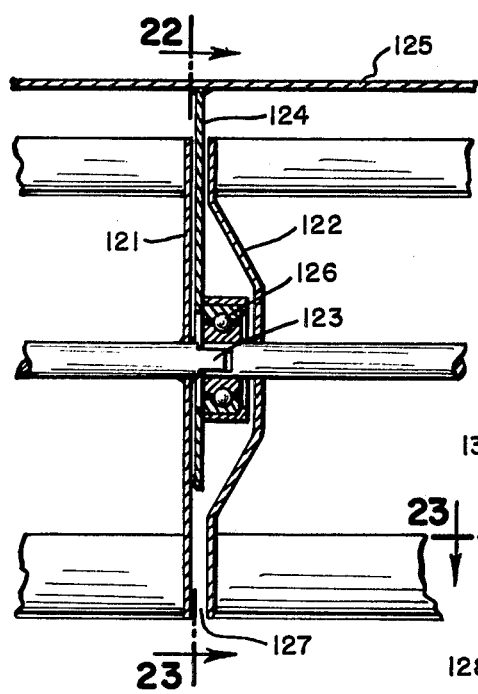
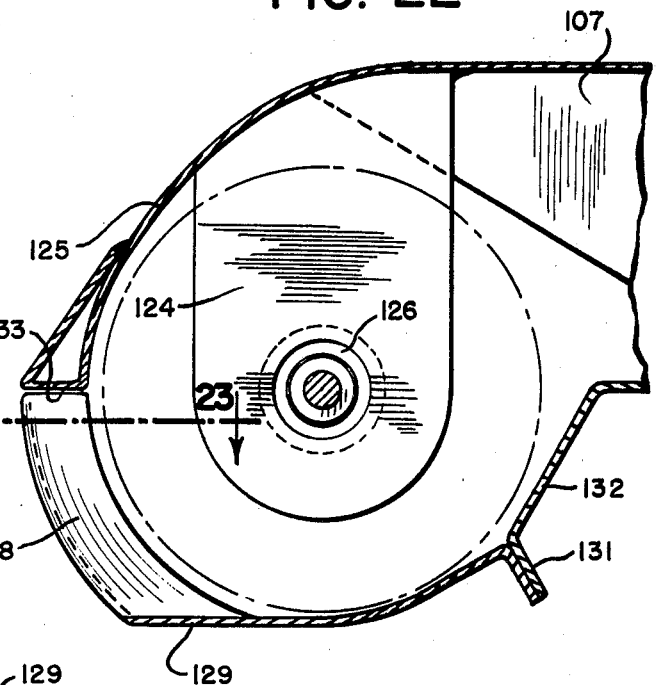
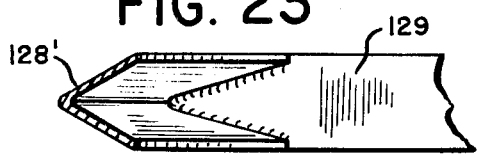

INVENTOR
Hugo S. Ferguson 3,673,773

CROSS-FLOW MOWING MACHINE

RELATED APPLICATION

This application is a continuation-in-part of application Ser. No. 699,596 filed Jan. 22, 1968, now abandoned.

BACKGROUND OF THE INVENTION

Mowing machines in current use are of three major types: the reel, the rotary, and the flail or hammer. In the reel type a plurality of helically curved blades operate against a shear plate to cut the grass. Careful sharpening and adjustment to maintain a uniform contact or close clearance between blades and shear plate across the entire width of reel are required for gOod mowing, thus involving substantial maintenance expense. Also, tall grass and weeds are not easily cut by reel mowers.

The rotary mower comprises a vertical shaft with a blade horizontally affixed to the bottom end. The shaft is turned at high speed to sever the grass and throw it clear of the mower. Sharpening is generally simpler than for the reel mower, and tall grass and weeds can be mowed fairly readily. Although all mowers are inherently dangerous, particularly when power operated, the rotary mower is especially so. The tip velocity of the blade often exceeds 20,000 feet per minute, endangering the feet of a careless user and throwing stones, etc. with great velocity.

The flail or hammer mower operates on the principle of flailing the grass off with a rotating flail or hammer. In general it cuts tall grass better than the reel mower and is less dangerous than the rotary. However, it is not widely used for ordinary lawn mowing where appearance is important.

The present invention provides a mowing machine operating on a different principle from existing mowers which has the advantages of both reel and rotary type mowers, but is largely free of their disadvantages, and has additional advantages not found in either.

SUMMARY OF THE INVENTION

The mower of the invention employs a cylindrical reel having a plurality of spaced blades, the reel being horizontally disposed on a carriage with the reel axis extending laterally thereof. The outer leading edges of the blades are sharp to form cutting edges. A blower conduit cooperates with the reel to form a blower of the cross-flow type with air flowing through the reel from the front thereof, the inlet of the conduit leaving the leading portion of the reel exposed to engage the grass, etc. to be mowed.

In blowers of the cross-flow or transverse-flow type, air passes through the blades at least twice in a direction transverse to the axis of the rotor, in passing from inlet to outlet. The shape of the blades and speed of rotation of the rotor are such that, with proper design of the blower conduit, vortices are formed around the blades at the outlet region of the rotor which result in overall flow of air through the rotor to the conduit. The direction of these vortices is the same as that of the rotor, that is, the vortex around a blade in the outlet region is clockwise for clockwiSe rotation of the rotor, and vice versa.

It has been found that vortices also are formed around the blades at the inlet region of the rotor, and these vortices have a direction of rotation opposite to that of the rotor. In the mower of the invention these vortices create a vortex action which causes the grass to be pulled against the moving blades of the reel and sheared off, without requiring a shear plate. The cut grass is then drawn through the reel and conduit by the overall flow of air therethrough, and either deposited on the ground or collected by a suitable bag or grass catcher.

In general the top of the grass is cut first as the mower is moved forward, and then the grass is cut prOgressively lower until the final height is reached as determined by the height of the reel above the ground. The length of the cuttings depends on several factors including height of the grass, height of the front of the housing above the ground, number of blades on the reel, speed of rotation, etc. For short grass which reaches the reel unimpeded by the housing, and with a sufficient number of blades on the reel, the grass tends to be cut in short lengths and distributed evenly over the ground if not collected. Due to the blower action, leaves and other debris may be collected along with the cut grass. For tall grass the initial cuts may be quite long. However, expelling of the cut grass by the blower action greatly reduces clogging and stalling under adverse conditions.

It is preferred to rotate the reel so that the lower blades move in the forward direction. In this manner any cut grass, leaves or debris which is not immediately sucked into the blower conduit is pushed forward and has another chance of being picked up. Also, in the event a stone is hit, it will be thrown forward away from the user. Rotation in the opposite direction is possible, however.

It has been found that a number of factors are involved in securing good mowing. Important factors are the time interval between the successive arrival of blades at a given cutting position and the peripheral spacing of the blades, as well as the peripheral velocity. Another factor is adequate blower action. Further, the design and tilt of the blades are important to avoid accumulation of grass on the blades under variouS mowing conditions. These aspects of the invention are discussed in detail hereinafter in connection with the specific embodiments, and further features promoting satisfactory operation are described.

For the cylindrical reel, both straight and helically-curved blades have been employed with success. In both cases, the blades define a cylindrical outer surface upon rotation. It is preferred at the present time to use curved blades since this reduces blower noise and has other advantages mentioned hereinafter.

Although the mower of the invention uses a reel, because of the different principle of operation no shear plate is required and consequently precise sharpening and adjustment are avoided. It can also cut tall grass and weeds. Thus it has important advantages over the conventional reel mower. The speed of rotation of the reel is considerably greater than in the conventional reel mower. However, the blade velocity can be much less than that of rotary mowers and consequently stones will be thrown much less violently. Further, since the energy in a thrown object varies with the square of the velocity, the danger is much reduced. In addition, objects will be thrown only in one direction so that effective shielding is simpler. Inasmuch as the final cutting of the grass is at the bottom of the reel, by mounting the wheels on the same axis as the reel or in vertical alignment therewith, scalping of the lawn at the top and bottom of a terrace may be reduced or avoided with proper mowing technique.

BRIEF DESCRIPTION OF THE DRAWINGS

FIGS. 7 a – d show various blade cross-sections;

FIG. 8 illustrates the operation of the mower with the lower blades moving rearwardly;

FIG. 9 illustrates operation of a mower similar to FIGS. 1–4 but without a grass catcher;

FIG. 14 shows details of the wheel mounting structure;

FIGS. 15 and 16 are perspective and cross-sectional views of a reel having helically curved blades, used in the mower of FIG. 10;

FIG. 17 illustrates further examples of blade cross-sections and angular disposition;

FIG. 18 is a perspective of another embodiment of the invention.

FIG. 21 shows the use of two reels for a wider cut; and

FIGS. 22 and 23 show an arrangement for avoiding ridges of grass at reel partitions.

DESCRIPTION OF THE SPECIFIC EMBODIMENTS

Figure 1:
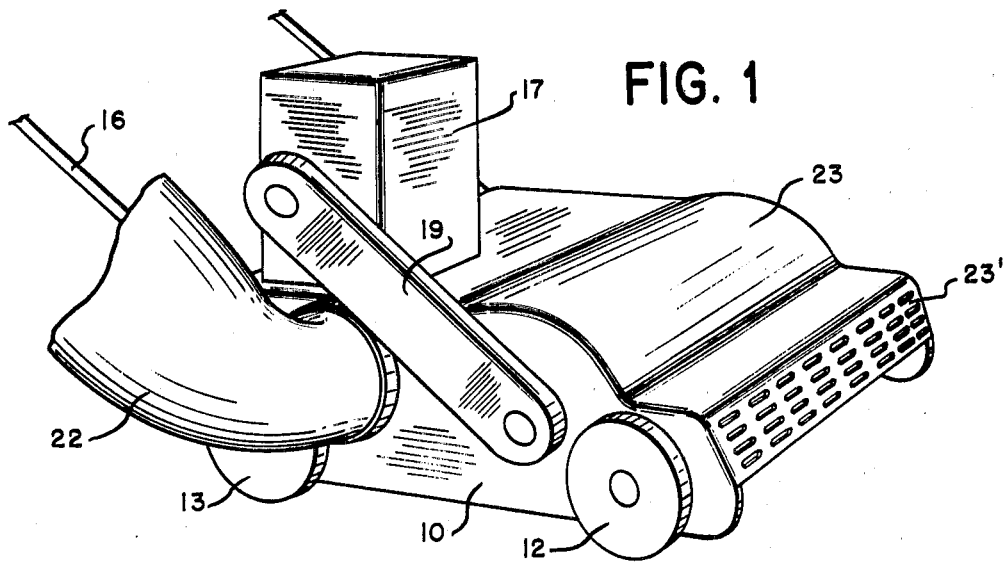
FIG. 1 is a perspective view of a mowing machine of the invention.
Figure 2:
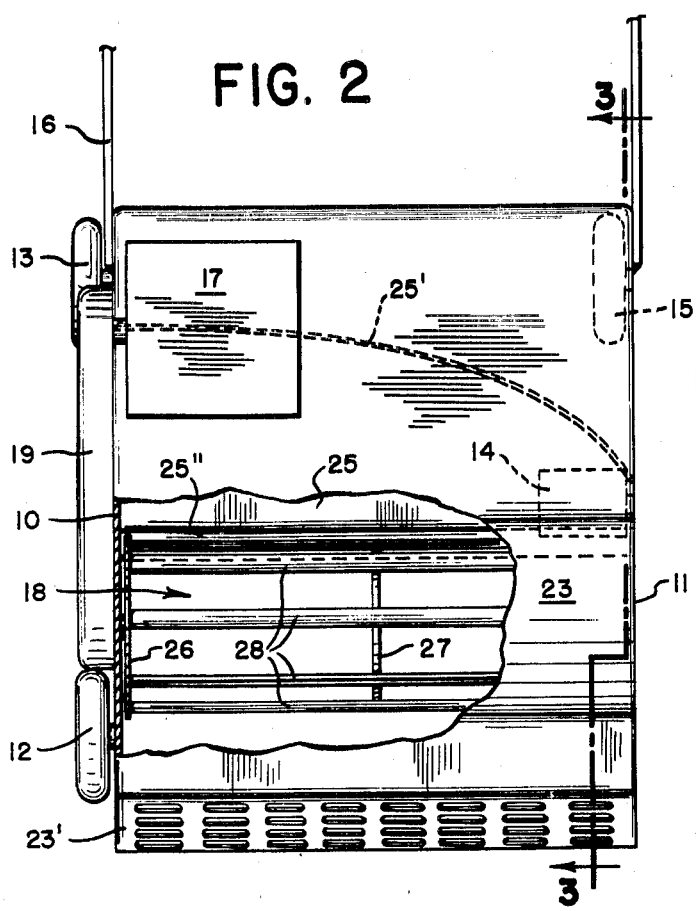
FIG. 2 is a plan view thereof with a portion of the cover broken away.
Figure 3:
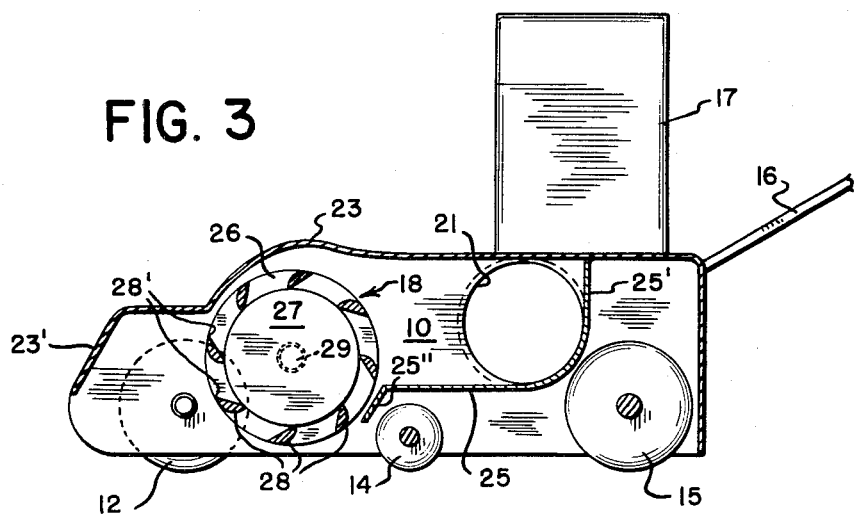
FIG. 3 is a side view taken along the line 3—3 of FIG. 2.

Referring to FIGS. 1–3, the mower carriage includes side plates 10, 11 and wheels 12–15 mounted thereon. A handle 16 may be attached thereto in desired manner. Height adjustment may be provided conventionally, but is not shown. A motor indicated diagrammatically at 17 drives the reel 18 through a V-belt or chain (not shown) covered by a guard 19. An opening 21 in side wall 10 has a grass catching bag 22 Mounted thereagainst in any convenient manner, as by a clamp ring. The upper plate 23 of the housing is extended forwards and downwards at 23' to form a protective guard to prevent stones or other debris from being freely thrown forward. The guard is perforated to allow entry of air. Wheels 14 and 15 are shown mounted in line with the reel 18 to avoid tracking down the grass before the mower has passed over it, and to allow cutting grass close to objects.

A lower sheet member 25 (FIG. 3) together with side plates 10, 11 and a portion of the upper plate 23 form a blower conduit leading from the reel 18 to the discharge opening 21. Member 25 has a bottom portion extending across the mower between the sidewalls, and a curved rear portion 25' extending upwardly to upper plate 23 and curving from side plate 11 to opening 21 as seen in FIG. 2. The upper and lower members and sidewalls may be joined in any suitable manner, as by welding.

Figure 4:
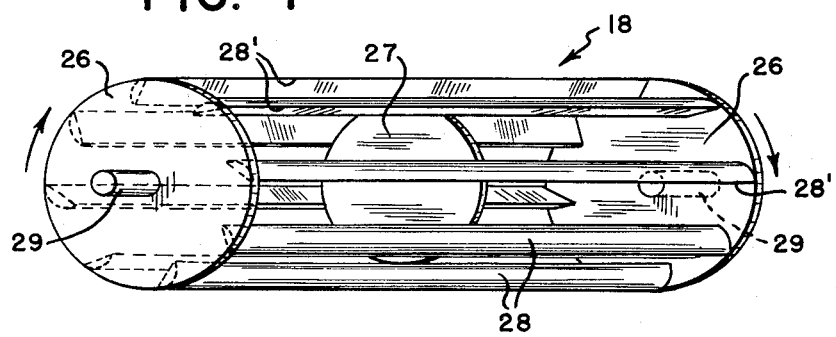
FIG. 4 is a view of the reel alone.

Reel 18 is shown by itself in FIG. 4, and comprises end disks 26 and an intermediate stiffening disk 27 forming frame members to which blades 28 are affixed in desired manner in a cylindrical configuration. The leading edges 28' are sharp to form cutting edges. Stub axles 29 are suitably journalled in side plates 10, 11. If desired, the axle may pass through the reel.

Figure 5:
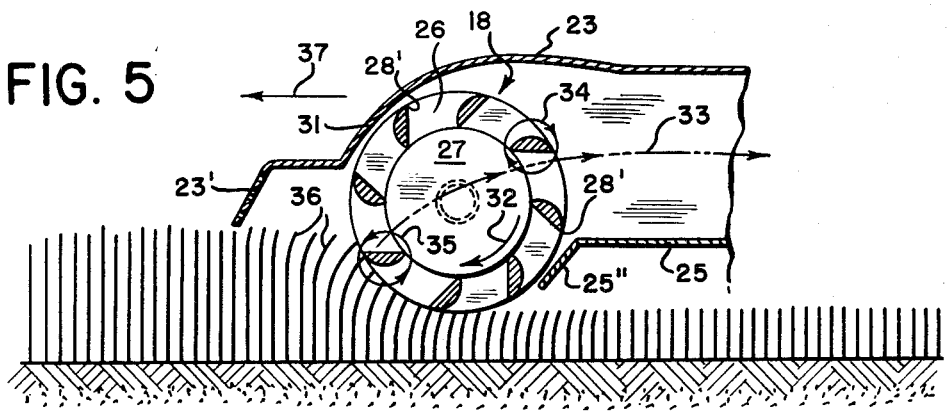
FIG. 5 illustrates the operation of the mower with the lower blades moving forwardly.

Referring to FIG. 5, the upper plate 23 is close to but spaced from the reel at 31, and the spacing gradually increases in spiral fashion toward the outlet. Lower plate 25 has a lip 25" which is close to but spaced from the reel to form a divider between intake and output. With reel rotation as shown by arrow 32, air flows through the reel and conduit as shown by the dot-dash path 33. Vortices are created around the blades at the output or trailing portion of the reel. One such vortex is indicated at 34, and it will be observed that its direction of rotation is the same as that of the reel, shown at 32. Where the conduit is adjacent the reel, at points 25" and 31, there is no substantial air flow through the blade area and no vortices are formed.

Vortex 34 is shown as circular for convenience of illustration. In actuality its shape will depend on that of the blade, and the velocity will be greatest close to the surface of the blade.

At the input or leading portion of the reel, vortices also form around the blades. One such vortex is indicated at 35, and it will be observed that its direction of rotation is opposite to that of the reel. These vortices around the blades in the intake area cause the grass 36 to bend toward the blades, as indicated, so that the grass is cut effectively by the sharp leading edges of the blades.

It will be understood that the vortices indicated by arrows 34 and 35 do not necessarily mean that there is actually an eddy or whirlpool of air around the blades. Rather, the arrows indicate a velocity component around the blades which, together with the overall air flow indicated by line 33, produces a resultant air flow near the sharp edges 28' which forces the grass against the blades. In accordance with aerodynamic theory, the velocity of air flowing past a blade in this inlet region will be greater over the trailing surface than over the leading surface, thereby creating a lower pressure over the trailing surface than over the leading surface. This difference in pressure, by itself, would result in a counter-clockwise circulation as indicated by arrow 35. However, the actual direction of air velocity at the tip of the blade will be the vector sum of the overall velocity component through the reel and the circulation component. This vector sum or resultant direction will be toward the sharp edge of the blade, hence forcing the grass into contact with the blade so that it is effectively cut. The phenomenon is believed analogous to the bound vortex used in aircraft wing theory.

Regardless of the exact explanation, it is found that when the reel and housing are designed to perform as a cross-flow blower, effective mowing of grass can be obtained.

The actual cutting operation will commonly be to first cut the tips of the grass as they come into contact with the blades of the reel, and then progressively cut the grass to the height for which the mower is set. Assuming the mower of FIG. 5 is moving in the direction of arrow 37, as the tips of the grass approach the reel, they will be drawn into contact with the blades and severed. Depending on the condition and height of the grass, one or more contacts between the reel blades and grass may occur before the tips of the grass are actually severed. For example, if the grass is sufficiently tall to extend above guard 23', it will be bent forward by the guard and will be somewhat convex when initially contacted by the sharp edges 28' of the blades, so that several contacts may take place before severing. Thereafter, subsequent blades will cut additional bits until the bottom of the reel passes by. As the grass is cut, the blower action sucks the grass through the reel along path 33 and delivers it to the catcher bag 22 (FIG. 1), along with any leaves or other debris that may be picked up. With the number of blades shown and grass of moderate height, most of the cut grass may be expected to pass through the reel, although a portion may pass between the reel and upper plate 23. With fewer blades as described hereinafter, and with taller grass, a greater portion of the grass may pass between the reel and upper plate 23.

As will be observed, the portions of the upper and lower walls 23, 25 of the blower conduit which are close to but spaced from the reel at 31 and 25", respectively, are on opposite sides of the reel and are arranged so that the portion of the upper wall at 31 is substantially above and forward of the portion of the lower wall at 25". These portions serve to divide the inlet and outlet regions of the blower, and accordingly the inlet region opens in the forward direction of travel of the mower. It will also be observed that portion 25" of lower wall 25 extends downwardly toward the bottom of the reel close to a horizontal plane tangent to the lowermost part of the path of travel of the reel blades. This largely prevents air from flowing into the inlet from behind the mower.

It will also be recognized that when the blades 28 are in their lower positions, the velocity vectors of vortices such as shown at 35 will be at small angles to the horizontal at the outer edges of the blades, so that air flowing into the lower portion of the inlet region from in front of the mower will have a substantial component of velocity tangential to the reel and opposite to the direction of movement of the blades thereat. Also, the velocity of air flow is greatest in this region since, as is known, in cross-flow blowers the maximum input velocity is commonly near the region where the reel blades travel from outlet to inlet regions, in this case near and forward of 25". These factors promote effective mowing.

The design of the reel blades and blower conduit, and the speed of rotation of the reel, may follow known practices for cross-flow blowers insofar as blower action is concerned. Since effective cutting rather than efficient blowing is the primary objective, it is found that design and construction for adequate blower action is not critical. However, for effective mowing it has been found that certain factors are important which are believed peculiar to mowing. Fewer blades with greater spacing between blades may be employed than are commonly used in blowers, and are highly advantageous. Also, superior results can be obtained with special blade designs. These aspects will be described in more detail hereinafter.

As an example, and not by way of limitation, in one embodiment which has been operated successfully, the reel was 24 inches long and 8 inches in diameter. Eight blades were used, formed of so-called half-oval stock 1 inch wide and ¼ inch thick sharpened at the leading edges and then hardened. The angle of the flat surface of each blade with the tangent to the reel circumference was 50°, and the reel was driven at 3400 RPM. The clearance at 31 (FIG. 5) was about ½ inch and that at 25'' about ¼ inch.

With these figures, the blades have a tangential velocity of about 7100 feet/min., as compared to a tip velocity of 21,300 feet/min. for a 24 inch cut rotary mower rotating at the same speed. Thus the tangential velocity of the mower of the invention is one-third that of the rotary mower, and the kinetic energy of thrown objects would be only one-ninth as great. In another embodiment a 6-inch diameter reel with a tangential blade velocity of about 5500 feet/min. was used with success, yielding kinetic energies only about one-sixteenth as great as the rotary mower.

An eight-blade reel rotating at 3400 RPM gives about 27,000 cuts per minute. A mower pushed at, say, 3 miles/hr. travels about 250 feet/min., yielding about 110 cuts per foot of travel. Consequently bits of grass a small fraction of an inch may be expected under normal mowing conditions, with perhaps longer pieces corresponding to the grass tips. By removing the bag 22, this finely divided grass may be thrown sidewise so as to divert it away from the operator, and left on the ground as a mulch.

Figure 6:
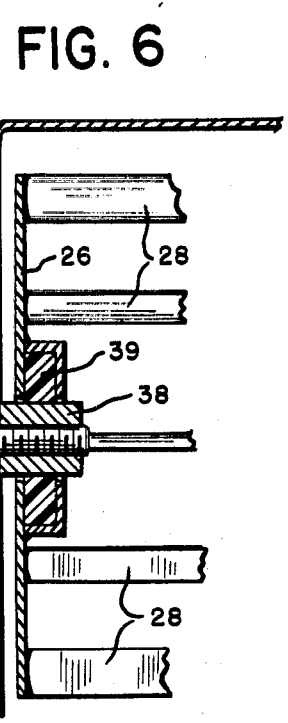
FIG. 6 shows an alternative reel mounting detail.

Referring to FIG. 6, an alternative reel bearing arrangement is shown. A short shaft 38 is bolted to side plate 11, and the reel rotatably mounted thereon by an antifriction bearing 39.

In FIG. 7, various blade cross-sections are shown: FIG. 7a shows the half-oval blade referred to above, with one surface flat and the other convex. As seen in FIG. 5, the flat surfaces are the leading surfaces and are inclined backwards from outer to inner edges with respect to the direction of rotation of the reel. The blade angle of 50° to the tangent, mentioned above, corresponds to a backward tilt of 40° with respect to the radius of the reel. A backward tilt of 30° has also been employed with success. FIG. 7b is similar to 7a, but the blade is hollow to reduce weight. Both tend to be self-cleaning in operation, since the inlet and outlet vortices 35 and 34 shown in FIG. 5 are in opposite directions, and hence the vortex about a given blade will change direction as it passes from inlet to outlet regions. FIG. 7c shows a simple usable form, but the self-cleaning action is not so effective and there may be a tendency for wet grass to accumulate in the concave region. FIG. 7d is still simpler, but is less rigid and may not be as effective as the preceding shapes since it does not have as great an air-foil efficiency. These and other shapes may be employed as desired, and further shapes will be discussed hereinafter which are believed particularly desirable.

FIG. 8 illustrates the reel rotating in the opposite direction from FIG. 5, and the blades and blower conduit changed accordingly. The vortices at the inlet and outlet are now opposite in direction to those of FIG. 5, as shown at 41 and 42. The vortex action at the inlet still causes the grass to bend toward the cutting edges of the blades, and it is found that effective mowing can be obtained. However, it appears that grass and other debris are not picked up quite as well, probably because in FIG. 5 any material not initially picked up will be driven forward and upward by subsequent blades, whereas in FIG. 8 it will be driven downward and rearward. Also, any stones, etc. will be thrown to the rear. Discomfort and possible danger may be reduced by placing a roller behind the reel, as indicated at 43.

FIG. 9 shows an embodiment similar to FIGs. 1–5, but without the grass catching arrangement. Here the blower conduit 44 is turned downwards at its discharge end, and serves to distribute the cut grass quite uniformly over the ground. Other specific housing shapes may be employed as desired, while preserving the cross-flow blower action with vortices as described.

As stated before, although reel rotation as in FIG. 8 is possible, rotation with the lower blades moving in the forward direction is preferred. The latter yields superior mowing, and has other advantages mentioned above. Further, the generally horizontal rather than vertical air flow in the outlet conduit promotes effective discharge, particularly with features described in subsequent embodiments.

Referring now to FIGs. 10–16, a mower is shown having a number of advantages over those previously described. A motor 51 drives reel 52 mounted for rotation in housing 53, as before. Here, however, the blades 54 of reel 52 are helically curved (FIG. 15), rather than being straight, while still forming a cylindrical reel in operation. This has been found to reduce the wind noise very substantially, while still yielding satisfactory cutting and cross-flow blowing action, and facilitates making a strong reel. Three blades are here shown, each twisted through about 120°, and are securely attached as by welding, to frame members comprising end disks 55 and intermediate stiffening members 56. The number and spacing of members 56 may be selected as desired to provide a sufficiently rigid structure. It will be understood that a precise helix is not essential, so long as the blades are twisted through an angle in general helical manner. With three blades and 120° twist, opposite ends of adjacent blades approximately meet at a line parallel to the axis of the reel. With a greater angular twist, or with more blades, opposite ends will overlap at such a line.

The housing 53 is designed to provide adequate cross-flow blower action, and chute 57 is attached at the rear of the housing to direct the cut grass laterally to one side, as indicated by arrow 58. The helical curvature assists in this action, since it produces a lateral component of velocity so that the resultant air flow is at an angle to the perpendicular to the reel axis in the direction of the chute outlet.

Figure 13:
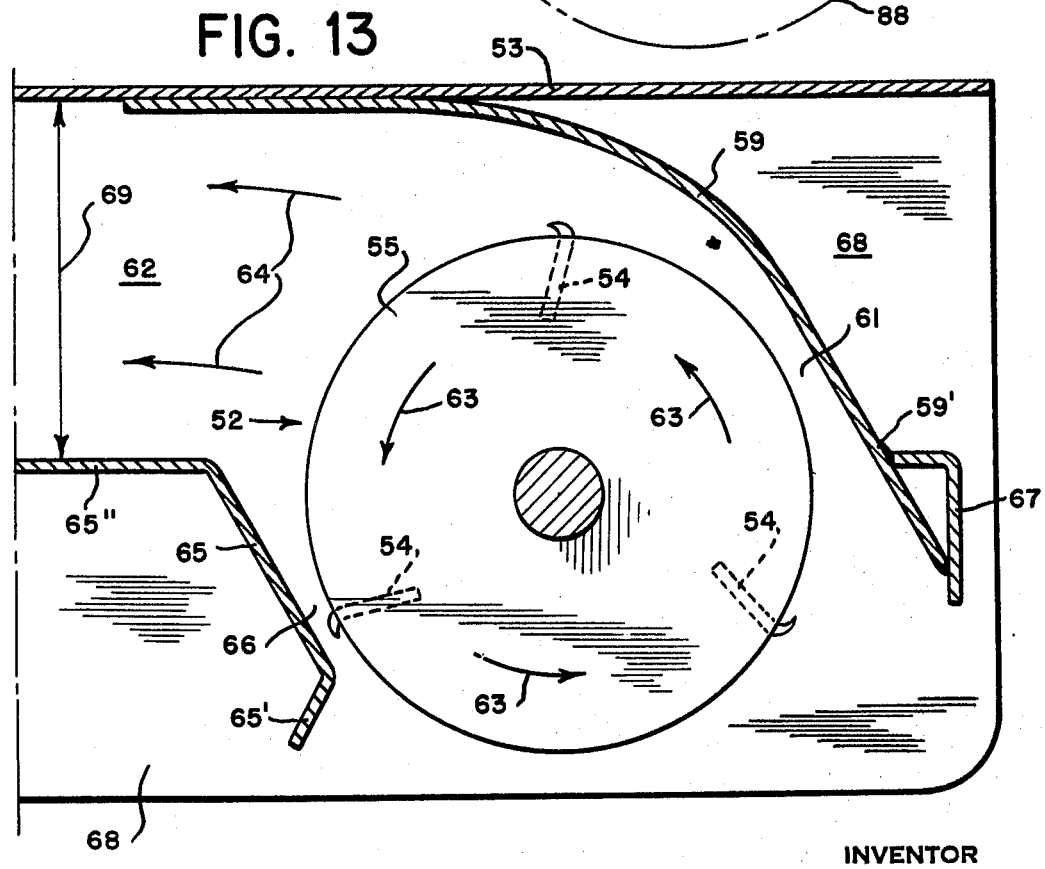
FIG. 13 is a cross-section of the blower conduit of the mower of FIG. 10.

FIG. 13 shows a cross-section of the blower conduit. Although similar to that of FIG. 5, it differs in detail. The upper plate 59 of the conduit is spaced from the reel at point 61, and the spacing increases in generally exponential manner toward the outlet region 62. Direction of reel rotation is indicated by arrows 63, and overall direction of air flow by arrows 64. The bottom plate 65 of the conduit is close to the reel at point 66, and slopes away from the reel toward the outlet region. Turned down flange 65' adds rigidity and, since it extends downwardly close to a horizontal plane tangent to the lowermost part of the path of travel of the reel blades, flange 65' largely prevents air from flowing into the inlet from behind the mower. The forward end 59' of the upper plate extends forward and downward, and an angle plate 67 is welded thereto to provide a strong rigid structure. Plates 59, 65 and 67 are welded to the side plates 68 of the housing.

In one specific construction a reel 7 inches in diameter and 20 inches wide was used, rotating at about 4600 RPM. The spacing at 61 was about ½ inch and that at 66 about ⅜ inch. The height 69 was about 4 7/8 inch, with the horizontal portion 65'' about ½ inch above the center of the reel. The air velocity at the output of the chute was in the neighborhood of 35 miles/hr. at the point of maximum velocity.

In this embodiment the front wheels of the mower are mounted so that their axles are approximately in vertical alignment with the reel axis. Thus the final cutting of the grass to its desired height takes place vertically above the points of contact between wheels and ground. With this arrangement, the danger of scalping a lawn at the top and bottom of a terrace is eliminated, or at least greatly reduced, assuming that the operator pushes the mower up and down the slope. Provision is made for height adjustment of the mower, while preserving the vertical alignment.

Figure 12:
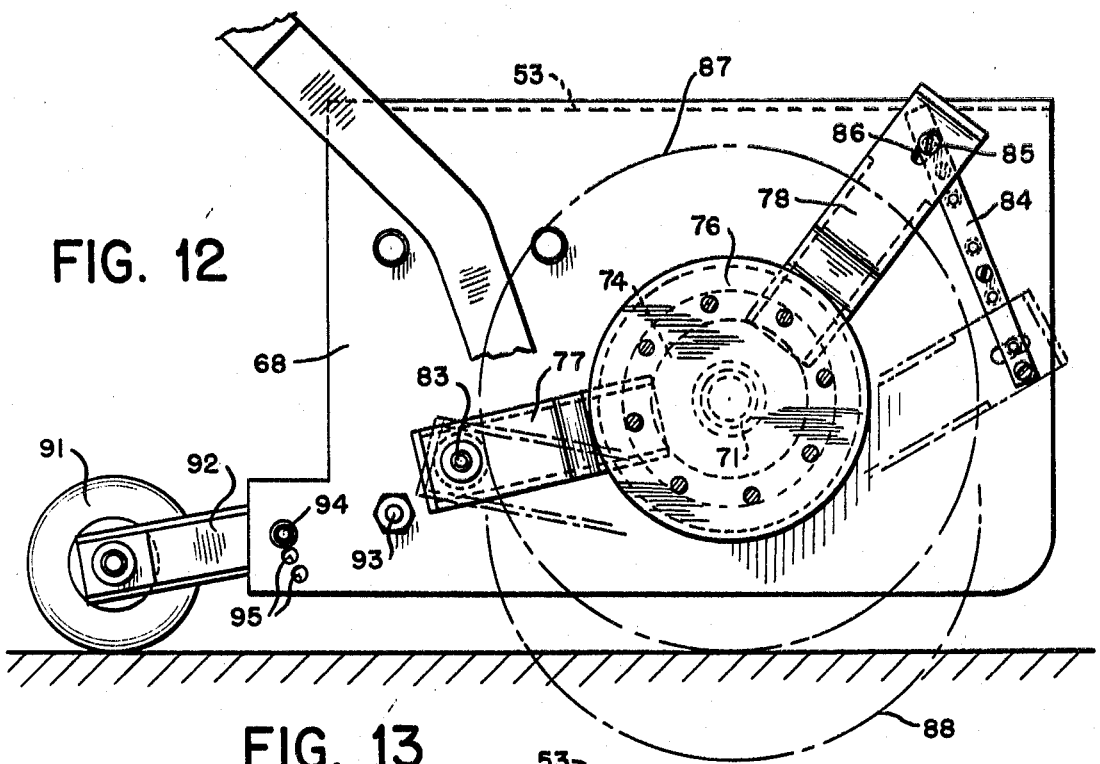

Referring to FIGS. 12 and 14, a short shaft 71 is threaded into each end of the reel and suitably secured in place as by a left-hand thread. Each shaft rotates in a bearing 72 held in a mounting 73 attached to side plate 68. FIG. 14 illustrates the drive side of the reel as seen from the top, and pulley 74 is attached to the reel shaft by a suitable key or pin.

Each wheel 75 is mounted on a frame comprising a disk 76 and brackets 77 and 78. The latter may have bent over portions for added strength. Wheel bearing 79 is mounted between the wheel and a ring 81 attached to disk 76 by machine screws. A cover plate 82 protects the assembly. Bracket 77 is pivotally mounted on side plate 68 at 83. A metal bar 84 is secured to the side plate 68 and has several tapped holes for receiving a bolt 85 which passes through a slot 86 in bracket 78. FIG. 12 shows in full lines the wheel mounting frame in its uppermost position, and circle 87 indicates the wheel position. The lowermost position is indicated in phantom, and the corresponding wheel position is indicated at 88. The axis of wheel 75 will move in an arc of a circle about pivot point 83, rather than in a vertical line, but with a sufficiently long pivot arm the department is not serious for the limited height adjustment commonly required. Preferably the wheel and reel axes coincide for the lowest mower adjustment (that shown in full lines) since the danger of scalping is then greatest.

Each end of roller 91 may be mounted on an arm 92 pivoted at 93, and arranged to be held in one of several positions by a bolt 94 passing through one of holes 95 and threaded into arm 92.

Although the blade cross-section shown in FIG. 7a has been found to give satisfactory mowing, under some conditions it has been found that grass tends to accumulate on the radially inward edges of the blades, despite the self-cleaning action described above. Although the cutting edges remained clean, the accumulation of grass cuttings is somewhat unsightly, and under some conditions may be deleterious.

FIG. 17a shows a blade which is quite simple to make, and performs very well. It is formed of a flat strip 96 of metal, with an edge 97 bent at an angle and sharpened to form a forwardly extending hook. A blade about 1 ¼ inch wide, with a hook angle of about 120° and a length C about ⅛ inch, mounted in the reel with the straight portion (as seen in cross-section) making an angle $\alpha$ with the radius of the reel of about 20°, gave very good results, although upon occasion there was some tendency to collect grass on the inner edge.

The blade of FIG. 17b is formed of half oval stock with a cutting lip, and may be more efficient than that of FIGS. 17a due to the closer approach to an air foil.

FIG. 17 c illustrates a blade and orientation which is preferred at the present time, and is used in the mower of FIGS. 10–16. Here flat strip stock is used, and the edge bent over and sharpened to form a hook (in cross-section). Unlike previously described blades, here the straight portion is tilted forward from outer to inner points thereof with respect to the direction of rotation of the reel. While it would appear that the forward tilt would be quite unsuitable for a cross-flow blower, in practice it is found to perform very well. A blade about 1 1/4 inch wide, with dimension C about ¼ inch and angle $\alpha$ about 15°, has given excellent results.

The forward tilt of the blade, as indicated in FIG. 17 c, is believed highly advantageous in avoiding grass accumulation on the blades under most mowing conditions. A rearward tilt, such as shown in FIG. 17 a, has been found to have a greater tendency to accumulate grass. It is also possible to mount the blade with the straight portion extending radially, that is, with a zero angle $\alpha$. This will still yield blower action due to the hook, and the hook portion (dimension C) may be made longer to increase blower action.

It is believed that the retention of grass on the blades is due to the summation of two forces. One is due to air being forced against the leading side of the blade and the other is centrifugal force. Under some operating conditions the resultant of these forces seems sufficient to prevent the overall air flow from carrying away the grass. Observation indicates that dry grass is more likely to accumulate than wet grass.

Since the centrifugal force varies as the square of the angular velocity, and as the first power of the radius, changing either the diameter of the reel or its speed of rotation will change the centrifugal force. The force of air on the leading side of the blades will also change with these factors, as well as with the shape and orientation of the blades. Higher air velocities appear to promote better blade cleaning, so that designing the blades for effective blower action without requiring excessively high speeds of rotation is desirable.

Certain observations concerning grass accumulation and removal may be made. With hook blades such as shown in FIG. 17 c, it has been noticed that some grass cuttings are held on the leading faces of the blades as the blades move from the inlet to the outlet region, and are blown off the blades in the outlet region. Some grass cuttings pass through the inlet portion of the reel and fold over the inner edges of the blades in the outlet region. Such cuttings are carried around to the inlet region where they are removed by the overall air flow. With a forward tilt, it is believed that centrifugal force assists in removing cuttings from the faces of the blades, since its direction is away from the faces and in the direction of overall air flow in the outlet region.

A wide range of tilt angles have been employed with blades of different cross-sectional shape, and found to be effective under particular mowing conditions. Examples have been given above of those found particularly satisfactory. The overall air flow may be changed by changing the tilt angle for a particular blade shape. With backward tilts, increasing the tilt up to a maximum angle of, say, about 45° to the radius usually increases overall air flow. Greater angles usually result in decreased air flow. With hook type blades such as shown in FIG. 17, the dimension C may be made greater to increase air flow. These factors permit adjusting the air flow to a desired range. For best overall performance under different mowing conditions, the blade of FIG. 17 c, with a forward tilt, is preferred at the present time.

It has been found that a number of factors are involved in securing good cutting. Important factors are the time interval between the successive arrival of blades at a given cutting position, and the peripheral spacing of the blades. With the lower blades moving forwards, it appears that each time a blade of the reel contacts the grass, it tends to throw the grass forward due to the mechanical force applied to the grass. The flow of air into the blower tends to pull the grass back toward the reel. However, because of inertia, a small time interval is required before the grass again comes into position with respect to the reel so that it can be cut effectively. Also, if the reel blades are spaced too closely together peripherally, the grass may not be able to reach a blade at an effective cutting angle. The result is that the grass tends to be flattened ahead of the reel and to be skinned lengthwise and shredded rather than properly cut, leaving a lawn of uneven cut and poor appearance. Also, the effectiveness of cutting tall grass seriously deteriorates.

The exact minimum interval between successive blade passages and the blade spacing will depend somewhat on the type of grass and time of year, since the resiliency of the grass will vary, and on the mowing conditions expected to be encountered. It has been found that the interval should not be less than about one millisecond, and preferably should be two milliseconds or more. A blade spacing of about two inches or more is considered highly desirable for satisfactory mowing under various conditions. These factors are related to the peripheral velocity and the number of blades of the reel. A velocity of about 5500 feet/min. is considered minimum, and higher velocities are desirable for satisfactory mowing under various conditions.

In the foregoing specific embodiments the time intervals and spacings are as follows: With a 6 inch diameter reel, eight blades, and a peripheral velocity of 5500 ft./min., the time interval is about 2.2 ms. and the peripheral spacing 2.4 inches. With an 8 inch diameter reel, eight blades, and a velocity of 7100 ft./min., the time interval is about 2.2 ms. and the spacing 3.1 inch. With a 7 inch diameter reel, three blades and 4600 RPM, the velocity is 8400 ft./min., the time interval about 4.3 ms., and the spacing 7.3 inches.

A 5 inch diameter reel, three blades and 6200 RPM has also been used successfully with ordinary type grass up to 7 or 8 inches deep. Here the time interval is about 3.2 ms., the spacing 5.2 inches, and the peripheral velocity 8100 ft./min.

A reel with three blades is presently preferred. With such a reel, for most of a revolution there will be only one blade in the inlet region and one blade in the outlet region, thereby leaving a large portion of the passage through the reel unobstructed. This facilitates passage of grass cuttings through the reel. Also, the lesser obstruction promotes better air flow and less lost power.

Figure 10:
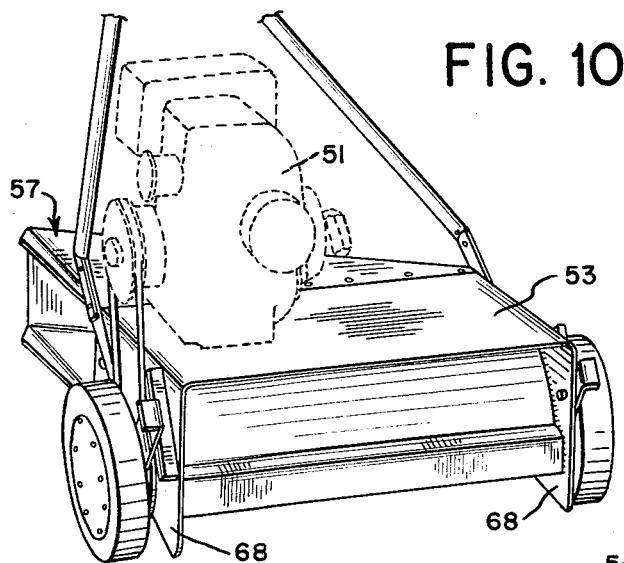
FIGS. 10, 11 and 12 are perspective, plan and side views of a mower in which the front wheels are in approximately vertical alignment with the reel, with provision for adjusting the height of cut.

Another factor is the blower action. Although blower effectiveness is not in itself a primary consideration, as mentioned before, the overall air flow should be sufficient to promote effective cutting and remove the cut grass without clogging the reel and discharge chute. An air flow of about ten cubic feet per minute per inch of cutting width is considered minimum, and considerably higher air flows are desirable. Mowers such as shown in FIGs. 10 and 18 yield of the order of 40–45 cu. ft./min./inch of cutting width. The air flow is calculated by measuring air velocity at various points in the outlet region of the chute, and multiplying the average velocity by the cross-section at which the measurements were made. The velocity varies over the cross-section and is usually greatest near the rear wall of the chute. A maximum velocity of the order of 35 miles per hour has been found satisfactory.

Although maintaining the blades adequately sharp is simpler and less expensive than in a conventional reel mower, some users may prefer to buy new blades rather than have dull blades sharpened. This is facilitated in the mowers of the present invention inasmuch as no critical adjustments are involved.

FIG. 17 $d$ shows a blade having a replaceable cutting section. A backing bar 98 is formed of metal and affixed to end plates and spacers as described above. Replaceable blade 99 is shaped to clip over the edges of 98. It may be made of steel, plastic with hardening agents embedded in the cutting edge, or other suitable materials.

Referring back to FIG. 16, blades 54 with the shape and forward tilt of FIG. 17 $c$ are shown attached to an intermediate frame member 56. The member has outwardly extending portions at the trailing faces of respective blades and intervening regions 100 having a radial extent substantially less than the outwardly extending portions for a substantial part of the peripheral distance between blades. As shown, the radius of the member 56 is nearly that of the outer edges of the blades at their trailing faces, so as to provide firm support. However, at the leading faces the radius of the member is preferably equal to the radius of the inner edge of the blades, as shown, or not substantially greater. These cut-out regions 100 have been found advantageous to avoid leaving thin parallel ridges of grass in line with the frame members as may occur with full circle members extending to the tips of the blades. The member 56 may also be shaped as shown by the dot-dash lines to reduce the weight of the reel, provided the reel as a whole has adequate strength.

Figure 19:
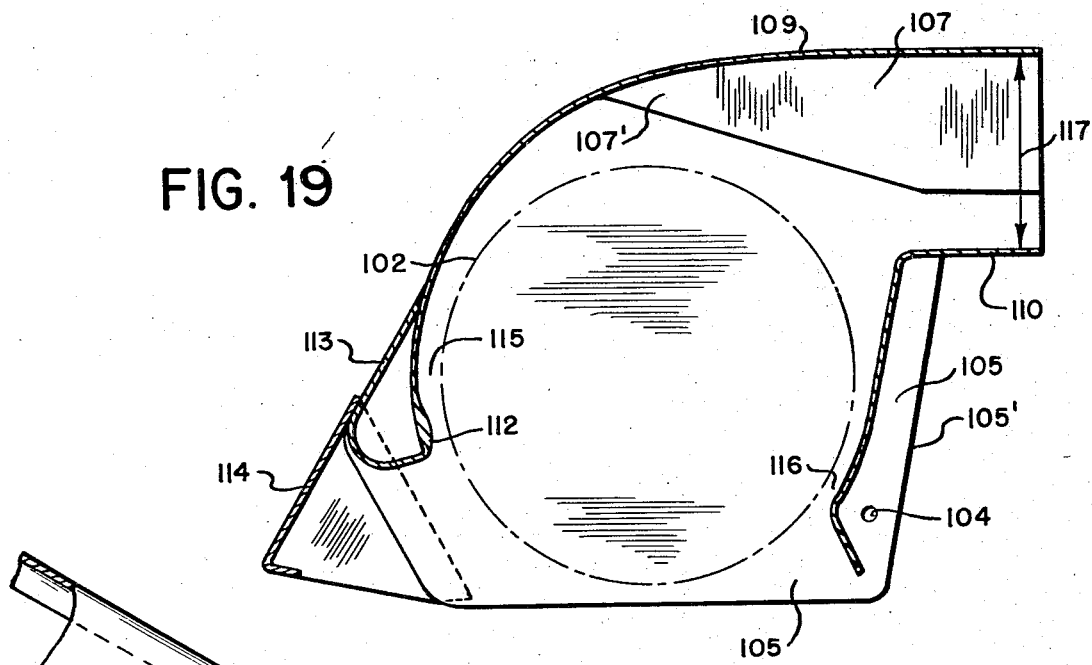
FIGS. 19 and 20 show a cross-section of the blower conduit and the vane arrangement therein.
Figure 20:
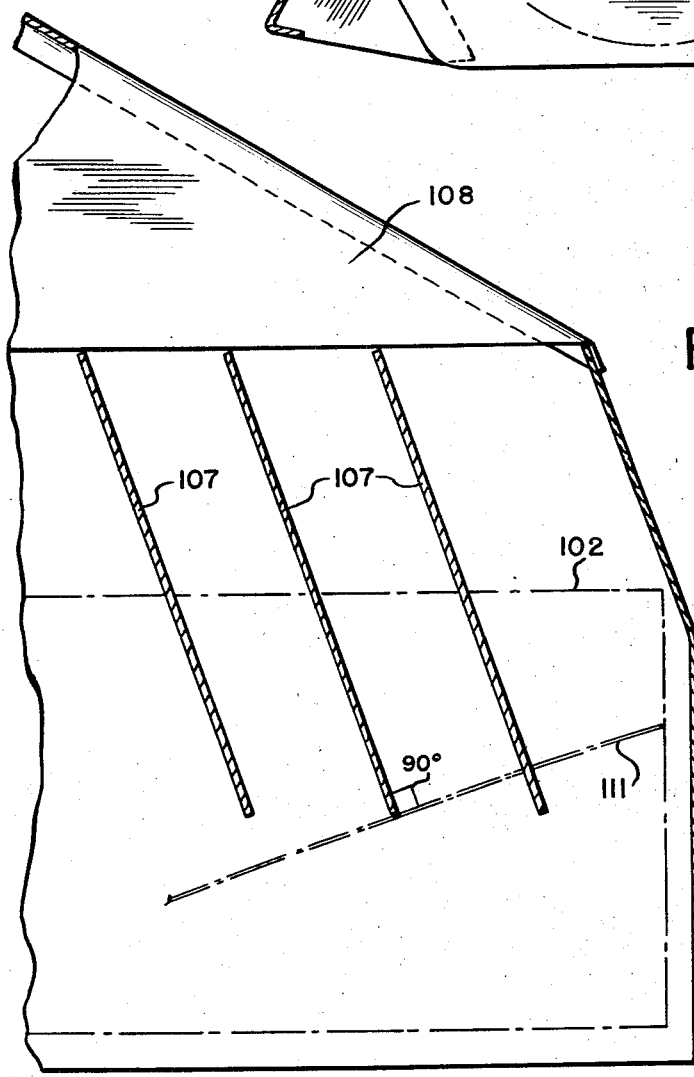

Referring to FIGs. 18–20, another embodiment is shown having further features over those described before. Here the mower rolls on a pair of wheels 101 without additional rear wheels or roller. The wheels 101 are coaxial with, or in vertical alignment with, the reel indicated by circle 102, and may be arranged for vertical adjustment as by providing a series of vertically aligned holes for the bolts forming the wheel axles. It is found that the housing can be sufficiently balanced about the wheel axles to make handling during mowing quite convenient. The reel is driven by a V-belt in the manner described before.

At the lower rear of the housing, a guard plate 103 is pivotally mounted at 104 on the side plates 105 of the blower conduit. Vertical extensions 106 on the sides of the guard plate have flange sections 106' which move into contact with edge 105' of the side plates 105 when the mower is tilted backward to its rest position. In normal mowing there will be some separation between flanges 106' and edges 105' and the guard plate will slide along the grass.

The guard plate is particularly designed to prevent the accidental advance of a foot into contact with the rotating reel within the housing. In the position shown in FIG. 18, the mower is tilted forward somewhat beyond the normal mowing position and the guard plate drops down. Further tilting would cause the plate to drop further, thus maintaining a protective barrier behind the reel.

In this embodiment vanes 107 are mounted in the housing in the outlet section of the blower conduit at an angle which directs the air and cut grass into the outlet chute 108 so as to promote effective grass discharge. As shown in FIG. 19, the vanes 107 are attached to the top plate 109 of the blower conduit and are spaced from the bottom plate 110. Preferably, as shown, the front portion of the bottom edges of the vanes begin at the top plate over the reel, at 107', and slope downwardly and rearwardly therefrom. Thus long grass cuttings which do not immediately pass between the vanes will slide down the sloping portions and through the passage between the bottoms of the vanes and the bottom plate 110 to the discharge chute. In this manner possible hanging up of grass on the vanes is prevented.

The vanes 107 are vertically disposed and are laterally inclined away from the perpendicular to the reel axis in the direction of discharge from the chute 108. The vanes may be curved in horizontal and/or vertical cross-section if desired, while maintaining a general vertical disposition and lateral inclination.

Figure 15:
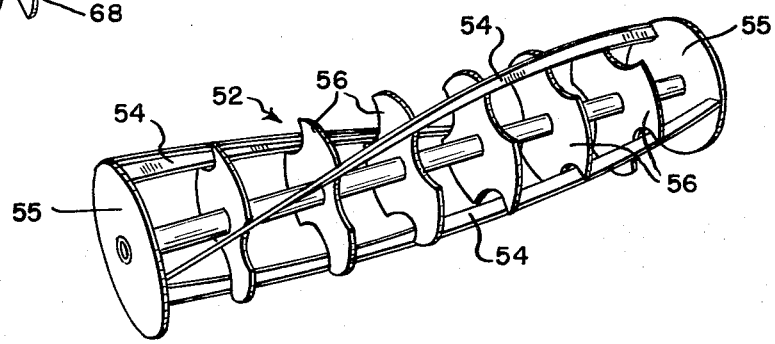
Figure 11:
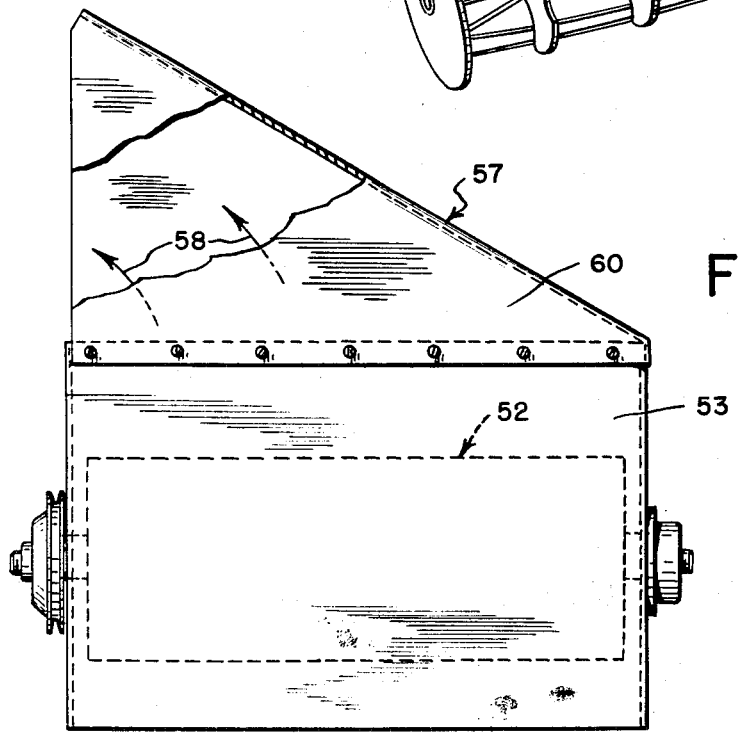

The vanes may be used with reels having axially straight blades. Here, however, the reel indicated by the dot-dash outline 102 has helically curved blades as shown in FIG. 15, and the vertical projection of one blade is indicated at 111 in FIG. 20. It has been found desirable to position vanes 107 so that they extend substantially perpendicular to the tangent to the blades in the uppermost position thereof, as indicated by the 90° angle in FIG. 20. Thus, the vanes are generally parallel with the direction of overall air flow at the blades in the outlet region of the conduit.

As shown most clearly in FIG. 18, the bottom of the outlet chute 108 is left open. This assures that the chute cannot become clogged under adverse mowing conditions, such as when cutting tall heavy wet grass. Under ordinary mowing conditions the cut grass will issue from the passages between vanes 107 and be directed toward the mouth of the chute in the same manner as with the mower of FIG. 10. The back of the chute is tapered so that its height is greater at the outlet, thus allowing for some dropping of the grass cuttings before being deflected by the chute. Normally grass does not fall down through the open bottom of the chute. However, under the adverse conditions mentioned, grass may do so. The spacing of vanes 107 may be selected to guard against a user reaching into the blower conduit while the reel is rotating.

FIG. 19 shows a further modification of the blower conduit. By curving upper plate 109 of the blower conduit so that its leading edge 112 is the nearest point to the reel, there is little tendency to accumulate grass at this point. The leading edge is strengthened by a plate 113 similarly to that shown in FIG. 13. The vertical separation between upper and lower plates 109, 110 of the blower conduit in the outlet region is somewhat less than in FIG. 13, to yield a somewhat higher air velocity. If desired, a front guard plate 114 may be attached to reinforcing member 113 so as to prevent any objects from being thrown forward. Guard 114 is preferably perforated as indicated in FIG. 1.

In one specific embodiment, the reel and rotational speed was the same as that of FIGs. 10-16. The spacing in region 115 was about ½ inch and was reduced at the tip 112 to about ⅜ inch. The spacing at region 116 was about ⅜ inch. The lower wall 110 of the outlet conduit was about 2 inches above the reel axis and the conduit height 117 was about 3 ¼ inches.

It will be appreciated that the safety features of the mower of FIGs. 18–20 provide almost complete protection even with a careless user, both as to the user himself and as to others who may be nearby.

Vanes such as shown in FIGs. 19,20 may also be used to advantage with discharge chutes having closed bottoms, such as illustrated in the embodiment of FIGS. 10–16. The vanes direct the air flow from the reel to the chute at an angle toward the mouth of the chute which promotes effective discharge of the cut grass. They also inhibit possible formation of an eddy near the corner 60 of the chute which might impair the effectiveness of the mowing at this end of the reel. These factors become particularly important as the size of the discharge chute is reduced to make a more compact machine.

Upon occasion there is need for a very wide cut, such as for a riding type mower. While ganging two or more separate mowers may be resorted to, it is also possible to increase the width of the reel and associated blower housing. To avoid the need for making a very long reel of adequate strength, two or more reels of ordinary length may be employed, say 20–30 inch reels, with suitable intermediate support.

Referring to FIGs. 21–23, portions of two reels having adjacent end plates 121 and 122 are splined or pinned together at 123 so that they rotate together. Driving may be at only one end of the combination. A support plate 124 is attached to the upper plate 125 of the blower housing and supports a bearing 126 in which the reels rotate.

The reel end plates 121, 122 may be closely spaced, but nevertheless there will be a gap 127 where no cutting blades are present. To avoid leaving a ridge of grass at the gap, a V-shaped finger 128 may be mounted in front of gap 127. The finger 128 may be attached to either the upper or lower plates of the blower conduit, or to both. As shown in FIGs. 22 and 23, a narrow strip of metal 129 is attached to the flange 131 of the lower plate 132. It extends forwardly at the gap 127 between the reels. Finger 128 is welded thereto and has a V-shaped cross-section with the pointed end 128' directed forwards. If desired, for strength, the upper end 133 may be attached to the reinforcing plate 125. The finger 128 parts the grass immediately in front of gap 127 and directs it toward the reels on either side so that effective cutting will take place.

From the foregoing it is believed apparent that the mower of the invention has significant advantages over those now in common use. It is capable of cutting long or short grass and, on well maintained lawns, yields a fine appearance. Construction is relatively simple and non-critical, and maintenance is relatively simple. With normal frequency of mowing, the cut grass is finely divided and, without a catcher, is distributed fairly evenly over the ground as a mulch. With a catcher, leaves and other debris may be collected along with the grass, leaving a clean appearing lawn.

While especially useful for lawn mowing, with suitable size reels other crops could be mowed. Power propulsion and ganging, as in conventional type mowers, may be used if desired.

The invention has been described in connection with specific embodiments thereof. It will be understood that modifications may be made within the spirit and scope of the invention.

I claim:

1. A mowing machine which comprises
   a. a carriage,
   b. a cylindrical reel having a plurality of circumferentially spaced fixed blades spaced from the reel axis with gaps between the blades,
   c. means for mounting the reel horizontally on said carriage with the reel axis extending laterally of the carriage,
   d. driving means for rotating said reel about the axis thereof with the lower blades moving in the forward direction of travel of the mowing machine,
   e. the outer leading edges of said blades being sharp to form cutting edges,
   f. and a blower conduit cooperating with said reel including upper and lower wall sections extending laterally along the length of the reel and having respective portions close to the reel on opposite sides thereof to divide inlet and outlet regions of the blower,
   g. at least a portion of the leading faces of the reel blades being non-radial and sloping backward from outer to inner regions thereof with respect to the direction of rotation of the reel to form, with said blower conduit, a blower of the cross-flow type with air flowing through the reel from inlet to outlet regions thereof,
   h. said inlet region opening downwardly and forwardly in the forward direction of travel of the mowing machine whereby air flowing into at least the lower portion of the inlet region from in front of the mowing machine has a substantial component of velocity tangential to the reel and opposite to the direction of movement of the blades in said lower portion of the inlet region,
   i. a portion of the reel in said inlet region being exposed to material to be mowed,
   j. whereby the cross-flow blower action and the blades of the reel mow the material without the use of a fixed blade in shearing relationship with the reel blades.

2. A mowing machine according to claim 1 in which the diameter and number of blades of the reel and the normal speed of rotation thereof are predetermined to yield a time interval between the successive arrival of blades at a given rotational position which is not less than about one millisecond, the peripheral spacing of the blades being not less than about two inches.

3. A mowing machine according to claim 2 in which the peripheral velocity of the blades is greater than about 5500 feet per minute.

4. A mowing machine according to claim 2 in which the air flow is greater than about ten cubic feet per minute per inch of cutting width of the reel.

5. A mowing machine according to claim 2 in which said time interval is not less than about two milliseconds.

6. A mowing machine according to claim 5 in which the reel has three equally-spaced blades, the air flow is greater than about ten cubic feet per minute per inch of cutting width of the reel, and the peripheral velocity of the blades is greater than about 5500 feet per minute.

7. A mowing machine according to claim 6 in which said blades are generally helically curved with opposite ends of adjacent blades approximately meeting at a line parallel to the axis of the reel or overlapping at a said line.

8. A mowing machine according to claim 1 in which the air flow is greater than about ten cubic feet per minute per inch of cutting width of the reel, and in which the diameter and number of blades of the reel and the normal speed of rotation thereof are predetermined to yield a time interval between the successive arrival of blades at a given rotational position which is not less than about two milliseconds and a peripheral velocity of the blades which is greater than about 5500 feet per minute, the peripheral spacing of the blades being not less than about two inches.

9. A mowing machine according to claim 8 in which the cross-section of said blades has an approximately straight portion on the leading side thereof from the inner edge toward the outer edge and has a forwardly extending hook at said outer edge, said hook being sharp to form a cutting edge and said approximately straight portion of the blade cross-section being inclined forwards from outer to inner points thereof with respect to the direction of rotation of the reel at a substantial angle to the radius of the reel.

10. A mowing machine according to claim 1 in which said blades are generally helically curved.

11. A mowing machine according to claim 10 in which the number of blades and curvature thereof are predetermined so that opposite ends of adjacent blades approximately meet at a line parallel to the axis of the reel or overlap at a said line.

12. A mowing machine according to claim 1 in which the cross-section of said blades has an approximately straight portion on the leading side thereof from the inner edge toward the outer edge and has a forwardly extending hook at said outer edge, said hook being sharp to form a cutting edge.

13. A mowing machine according to claim 12 in which the cross-section of the blades is convex on the trailing side thereof.

14. A mowing machine according to claim 12 in which said approximately straight portion of the blade cross-section is approximately radially extending or inclined forwards from outer to inner points thereof with respect to the direction of rotation of the reel.

15. A mowing machine according to claim 12 in which said approximately straight portion of the blade cross-section is inclined forwards from outer to inner points thereof with respect to the direction of rotation of the reel at a substantial angle to the radius of the reel.

16. A mowing machine according to claim 1 in which said reel has at least one frame member between the ends thereof to which said blades are attached, said frame member being perpendicular to the axis of rotation of the reel, said frame member having uniformly thin outwardly extending portions at the trailing faces of respective blades and intervening regions having a radial extent substantially less than said outwardly extending portions for a substantial part of the peripheral distance between blades, the radius of said frame member at the leading face of each blade being not substantially greater than the radius of the inner edge of the blade and the radius of the frame member at the trailing face of each blade being nearly that of the outer edge of the blade.

17. A mowing machine according to claim 1 in which the peripheral velocity of the blades is greater than about 5500 feet per minute.

18. A mowing machine in accordance with claim 1 in which the portion of said lower wall section which is closest to the reel is below and rearward of the portion of said upper wall section which is closest to the reel.

19. A mowing machine in accordance with claim 18 in which said lower wall section extends downwardly close to a horizontal plane tangent to the lowermost part of the path of travel of the reel blades.

20. A mowing machine in accordance with claim 1 including a guard extending forwardly of the upper portion of said blower conduit and having a downwardly extending portion in front of said reel, said guard having openings therein allowing passage of air therethrough.

21. A mowing machine in accordance with claim 1 in which said blades have flat leading surfaces and convex trailing surfaces.

22. A mowing machine in accordance with claim 1 in which said blower conduit extends rearwardly from said reel and then laterally, with a discharge opening on one side of the mowing machine.

23. A mowing machine in accordance with claim 1 in which said blower conduit extends rearwardly from said reel and downwardly to provide a discharge opening toward the ground behind said reel.

24. A mowing machine which comprises
    a. a carriage,
    b. A cylindrical reel having a plurality of circumferentially spaced fixed blades spaced from the reel axis with gaps between the blades,
    c. means for mounting the reel horizontally on said carriage with the reel axis extending laterally of the carriage,
    d. driving means for rotating said reel about the axis thereof with the lower blades moving in the forward direction of travel of the mowing machine,
    e. the outer leading edges of said blades being sharp to form cutting edges,
    f. and a blower conduit cooperating with said reel including upper and lower wall sections extending laterally along the length of the reel and having respective portions close to the reel on opposite sides thereof to divide inlet and outlet regions of the blower,
    g. said lower wall section extending downwardly behind the lower portion of the reel close to a horizontal plane tangent to the lowermost part of the path of travel of the reel blades,
    h. at least a portion of the leading faces of the reel blades being non-radial and sloping backward from outer to inner regions thereof with respect to the direction of rotation of the reel to form, with said blower conduit, a blower of the cross-flow type with air flowing through the reel from inlet to outlet regions thereof,
    i. said inlet region opening downwardly with a lower portion of the reel in the forward direction of travel of the mowing machine exposed to material to be mowed whereby air flowing into at least the lower portion of the inlet region from in front of the mowing machine has a substantial component of velocity tangential to the reel and opposite to the direction of movement of the blades in said lower portion of the inlet region,
    j. whereby the cross-flow blower action and the blades of the reel mow the material without the use of a fixed blade in shearing relationship with the reel blades.

25. A mowing machine which comprises
    a. a carriage,
    b. a cylindrical reel having a plurality of circumferentially spaced blades extending continuously between the ends of the reel with gaps between the blades,
    c. means for mounting the reel horizontally on said carriage with the reel axis extending laterally of the carriage,
    d. driving means for rotating said reel about the axis thereof with the lower blades moving in the forward direction of travel of the mowing machine,
    e. the outer leading edges of said blades being sharp to form cutting edges,
    f. and a blower conduit cooperating with said reel including upper and lower wall sections extending laterally along the length of the reel and having respective portions close to the reel on opposite sides thereof to divide inlet and outlet regions of the blower,
    g. at least a portion of the leading faces of the reel blades being non-radial and sloping backward from outer to inner regions thereof with respect to the direction of rotation of the reel to form, with said blower conduit, a blower of the cross-flow type with air flowing through the reel from inlet to outlet regions thereof,
    h. said inlet region opening downwardly and forwardly in the forward direction of travel of the mowing machine whereby air flowing into at least the lower portion of the inlet region from in front of the mowing machine has a substantial component of velocity tangential to the reel and opposite to the direction of movement of the blades in said lower portion of the inlet region,
    i. a portion of the reel in said inlet region being exposed to material to be mowed,
    j. whereby the cross-flow blower action and the blades of the reel mow the material without the use of a fixed blade in shearing relationship with the reel blades.

26. A lawn mower comprising a reel including cutting means comprising a cutting blade extending transversely for a substantial portion of the width of said reel and fixed thereto, said blade having a face extending at an angle of less than about 90° to a radial line extending from the axis of said reel, a casing including a chute portion and a reel housing portion having an upper part communicating with said chute portion and a downwardly facing lower opening defined, in part, by spaced transverse edges, means for rotatably mounting said reel in said reel housing portion for rotation about a generally horizontal axis and for travel of said cutting means through said opening and with a portion of said reel adjacent to said casing and with said reel being located such that a horizontal plane located tangent to the lowermost part of the path of said cutting means is spaced below the one of said transverse edges which is located relative to said opening in the direction of rotation of said cutting means, and means for rotating said reel.

27. A lawn mower in accordance with claim 26 wherein said reel comprises a pair of spaced plates and said cutting means comprises a plurality of circumferentially spaced transversely extending cutting blades connected to said plates with gaps between the blades, said gaps affording a flow path for clippings through said reel.

28. A lawn mower in accordance with claim 26 where said chute portion extends rearwardly from said reel housing portion for discharge of the clippings.

29. A lawn mower in accordance with claim 26 wherein said means for mounting said reel in said casing comprises a shaft extending from said reel and through said reel housing portion, and means for rotatably supporting the ends of said shaft for rotation relative to said casing.

30. A lawn mower comprising an engine having an output shaft, a reel having thereon cutting means comprising a cutting blade extending transversely for a substantial portion of the width of said reel and fixed thereto, said blade having a face extending at an angle of less than about 90° to a radial line extending from the axis of said reel, means connecting said reel to said output shaft for rotation of said cutting means about a generally horizontal axis, and wall means including an upper chute portion and a housing portion having an upper part communicating with said chute portion and having a lower part partially surrounding said cutting means and cooperating with said cutting means to afford an air flow for lifting grass into an erect position for engagement with said cutting means and for pneumatically conveying grass clippings for discharge of the clippings through said chute portion, said lower housing part including a downwardly facing opening defined, in part, by spaced transverse edges, said transverse edge which is located relative to said opening in the direction of rotation of said cutting means being located in spaced relation above a horizontal plane tangent to the lowermost part of the path of said cutting means.

31. A lawn mower comprising a reel including a circumferentially spaced series of fixed blades extending transversely for a substantial portion of the width of said reel, said blades each having, at its radially outermost edge, a cutting edge and including a face extending at an angle of less than about 90° to a radial line extending from the axis of said reel, a casing including a reel-housing portion including a downwardly facing opening defined, in part, by spaced transverse edges, and a chute portion at least partially merging with and extending from an upper part of said reel-housing portion, means rotatably supporting said reel within said reel-housing portion, in adjacent relation to and extending transversely of the mower with respect to at least one part of said reel-housing portion and with said reel being located such that a horizontal plane located tangent to the lowermost part of the path of said cutting edge is spaced below the one of said transverse edges which is located relative to said opening in the direction of rotation of said reel, and means for rotating said reel within said reel-housing portion in a direction such that the path of travel of said cutting edges adjacent to the ground is in the direction of intended advance of said mower relative to the ground.

32. A lawn mower comprising a reel including cutting means comprising a cutting blade extending transversely for a substantial portion of the width of said reel and fixed thereto, said blade having a face extending at an angle of less than about 90° to a radial line extending from the axis of said reel, a casing including a chute portion and a reel-housing portion having an upper part communicating with said chute portion and a downwardly facing lower opening, means for rotatably mounting said reel in said reel-housing portion for rotation about a generally horizontal axis and for travel of said cutting means through said opening and with a portion of said reel adjacent to said casing.

33. A mowing machine comprising
 a. a carriage,
 b. a cylindrical reel rotatably mounted on said carriage with the axis thereof substantially horizontal and extending laterally of the carriage,
 c. said reel having a plurality of circumferentially-spaced laterally-extending cutting blades with circumferentially-successive blades moving in substantially the same path of travel,
 d. said blades being narrow compared to the lateral length thereof and being spaced from the reel axis to leave the major portion of the interior of the reel free for air flow through the reel transversely thereof,
 e. the cross-section of said blades having at least a portion on the leading side thereof which slopes backwardly and inwardly with respect to the direction of rotation of the reel,
 f. a blower conduit cooperating with said reel to form therewith a transverse-flow blower having an outlet chute section,
 g. said conduit comprising upper and lower wall sections extending substantially parallel to the axis of the reel and having respective portions close to the reel at circumferentially spaced positions separating inlet and outlet regions of the blower,
 h. said inlet region opening downwardly with a portion of the reel therein exposed to material to be mowed,
 i. and motor means for driving said reel in a rotational direction such that the lower blades move in the normally forward direction of travel of the mowing machine,
 j. the fixed portions of the mowing machine being non-shearingly spaced from the path of travel of the blades of said reel.

* * * * *